UNITED STATES PATENT OFFICE.

JOSEPH S. LAIRD, OF ANN ARBOR, MICHIGAN.

PROCESS OF HYDRATING CLAY.

1,275,705.

Specification of Letters Patent. Patented Aug. 13, 1918.

No Drawing. Application filed December 24, 1917. Serial No. 208,625.

*To all whom it may concern:*

Be it known that I, JOSEPH S. LAIRD, a citizen of the Dominion of Canada, residing at Ann Arbor, in the county of Washtenaw and State of Michigan, have invented certain new and useful Improvements in Processes of Hydrating Clay, of which the following is a specification.

The present invention relates to hydrating clay or materials containing clay, for the purpose of producing plastic material therefrom. The object of the invention is to provide a process of hydrating clay, in which a relatively great amount of plasticity is imparted to the clay, the plasticity of the treated product being very much greater than that of the untreated material.

I have discovered that by subjecting clay, or material containing clay as an ingredient, to the action of superheated steam or water at a temperature very much above 100° C. and under pressure, the water exerts a solvent action on the clay, producing a colloid material, and upon cooling, the clay precipitates out, and upon examination is found to have materially different chemical and physical properties from those of the untreated material. The plasticity of the clay is very greatly increased, the shrinking of the hydrated clay during drying, and its tendency to crack are very greatly decreased; difficulties in grinding are reduced, and the clays are left with sufficient plasticity to be workable, even though the clay before working has been subjected to processes in which it was heated sufficiently to drive off its water of constitution (chemically combined water, as distinguished from water of plasticity) which ordinarily is not removed by heating even for several hours, to a temperature of 110° C. or thereabout.

In the purification of clay, for the removal of iron and certain other materials, it is found to be advisable to heat the clay to temperatures of 200° C. up to 500° C. or even considerably higher. Such heat treatment of the clay, while valuable in removing certain impurities from the clay, is open to the objection that the plasticity of the clay is thereby destroyed. The process forming the subject matter of my present invention can be applied to clays which have been so heated, even heated up to 700 or 800° C., and a plastic product produced therefrom.

Other kinds of clay, for example flint clay, which is ordinarily considered to be non-plastic, and which by wet grinding with water and treatment with alkali produces a clay in which the plasticity is only very slight, can be rendered plastic by treatment by my process. Such a clay, subjected to prolonged wet grinding, gave a product which could not be dried without excessive cracking, and the product of such wet grinding accordingly could not be directly used as a plastic material.

The strength of air-dried clay blocks furnishes a convenient mode of comparing plasticities, the high strength of the air-dried product going with high plasticity. In a particular example, a plastic clay, which originally contained 8.41% of combined water, had an air-dried strength of 43 pounds per square inch. This material was then completely dehydrated by heating the same to a temperature of 700° C. The so-heated product contained about 1.50% of water and possessed no plasticity whatever. This material was then subjected to the action of water in a closed vessel, heated under pressure to 250° C. for 16 hours. The product of this treatment, air-dried, had a strength of 38 pounds per square inch, and contained 7.65% of combined water.

It is necessary, as above stated, in rehydrating clay which has been subjected to elevated temperatures, to heat the same with steam to temperatures very much above 100° C. Wet steam at temperatures only a little above 100° C. will not produce the desired result. As an example of this, a portion of the dehydrated clay referred to in the preceding paragraph was heated in water under 100 pounds steam pressure, at a temperature of about 150° C. for a total of 96 hours. This was subjected to prolonged wet grinding and the product, when air-dried, had a strength of only 6 pounds per square inch and was very deficient in plasticity.

A particular process which has been developed, for the purification of clay, for plastic material, depends upon the removal of iron, or the deferruginization of the clay, by heating the same to temperatures between 200 and 500° C. in a current of dry chlorin and hydrochloric acid gas. The clay so treated, while comparatively white in color, is of course deficient in plasticity. The clay so treated, can then be rehydrated, according to the process of the present invention, and plasticity imparted thereto, in some cases substantially the entire plasticity of the original clay, and in some instances a much greater degree of plasticity than that possessed by the original clay.

As an instance of the treatment of flint clay, I mention the treatment of such a clay with water, by subjecting the same, in a closed container under pressure, to a temperature of 150° C. Such a clay in its original condition was substantially non-plastic, and such an original clay treated by wet grinding and alkali, had its air-dried strength increased only to about 20 pounds per square inch. This clay had not been subjected to high temperatures before subjecting to the steam treatment, and it accordingly was not necessary to employ the steam at very high temperatures. With such clays as have been subjected, during the preliminary treatment, to temperatures approaching a red heat, it is advisable to employ the steam pressure at a temperature considerably above the temperature of boiling water. Thus, while ordinary raw clay deficient in plasticity may be greatly improved by subjecting to a temperature of 125° C., clays which have been subjected to high temperatures in the preceding operations should be subjected to steam at a temperature of say 200–250° C., the corresponding steam pressures being from 500–700 pounds per square inch. The higher the temperature to which the clays have been subjected in the preparatory treatments, the higher should be the temperature and pressure in the treatment herein described.

While I have explained the process in great detail, stating particular temperatures, pressures and the like, the invention is not restricted to the use of these specific temperatures, temperatures either lower or higher than those herein stated in many cases being found to be highly advantageous.

In the treatment of raw or calcined clay with superheated steam under pressure, it is frequently advisable to combine this operation with a grinding or pugging operation. The rate of increase of plasticity of the clay is thereby increased, and of course the grinding operation reduces the size of the particles and both the grinding and pugging operations increase the homogeneity of the mixture. In carrying out my process, the steam may be wet or dry.

My invention is not restricted to the treatment of natural or calcined clay, *per se.* While I have given examples of the invention as applied to the treatment of natural or heated (more or less completely dehydrated) clay, the invention is not restricted thereto. In some instances it might be advisable to treat a mixture of dehydrated silica and dehydrated alumina (such dehydration being partial or complete). As an example of such treatment, I may mix together the two materials, reduce the mixture to an impalpable powder, and then subject the mixture to high pressure steam, while agitating if desired, until the desired degree of plasticity is developed.

I claim:

1. A process of increasing the plasticity of clayey material which comprises subjecting the same to the action of $H_2O$ at a temperature materially above 100° C.

2. A process of increasing the plasticity of clayey material which comprises subjecting clay previously heated to a calcining temperature, to the action of $H_2O$ at a temperature materially above 100° C.

3. The process of treating clay having a low plasticity to increase the plasticity thereof which comprises subjecting the same to the action of steam at a temperature above 100° C. under super-atmospheric pressure, until the plasticity has materially increased.

4. The process which comprises treating clay which has previously been deferruginized by a method involving the heating of said clay to a temperature approaching a glowing heat, which comprises subjecting the same to steam at a temperature above 100° C. under superatmospheric pressure for a protracted period.

5. The process which comprises subjecting clay material to steam at a temperature above 100° C. while working the mass.

In testimony whereof I affix my signature.

JOSEPH S. LAIRD.